July 5, 1966 E. J. ST. COEUR 3,259,714
LIQUID LEVEL SWITCH HAVING LANYARD ROTATING MEANS
Filed Jan. 7, 1964 2 Sheets-Sheet 1

INVENTOR
Edward J. St. Coeur
BY Walter G. Finch
ATTORNEY

July 5, 1966     E. J. ST. COEUR     3,259,714
LIQUID LEVEL SWITCH HAVING LANYARD ROTATING MEANS
Filed Jan. 7, 1964     2 Sheets-Sheet 2
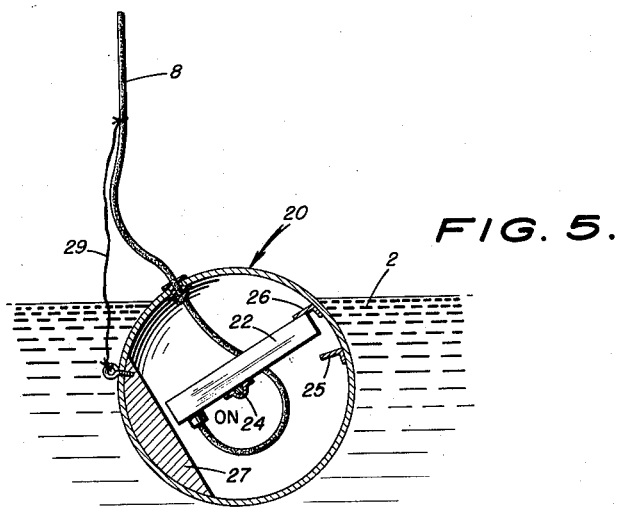
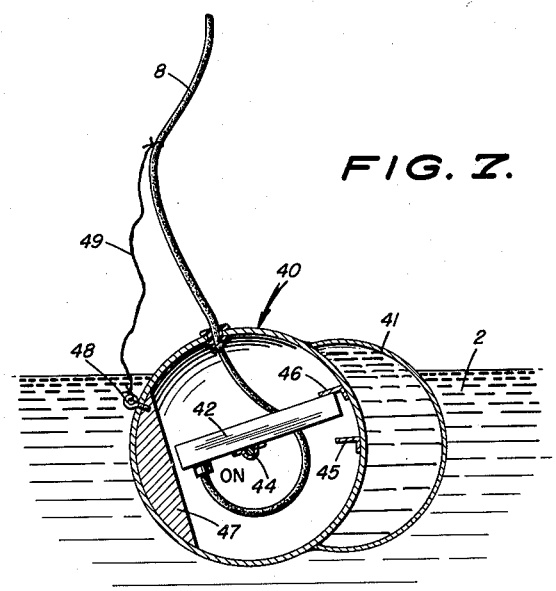
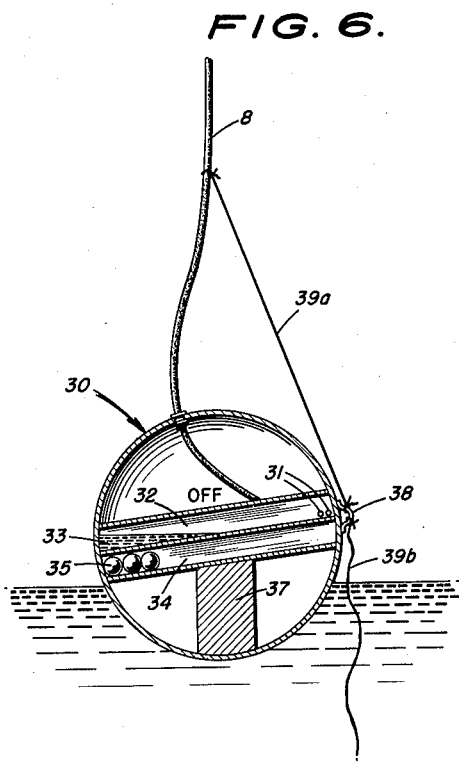
INVENTOR
Edward J. St. Coeur
BY Walter G. Finch
ATTORNEY various other objects of this invention.

United States Patent Office
3,259,714
Patented July 5, 1966

3,259,714
LIQUID LEVEL SWITCH HAVING LANYARD ROTATING MEANS
Edward J. St. Coeur, Joppa, Md., assignor of twenty-four percent each to William B. Snyder, Sr., and William B. Snyder, Jr., Joppa, Md.
Filed Jan. 7, 1964, Ser. No. 336,152
4 Claims. (Cl. 200—84)

This invention relates generally to liquid level responsive devices, and more particularly it pertains to free floating self contained switches.

Many float switches have been designed in the past, but they all have had the disadvantage of requiring a leverage which extends either in or over the liquid. Consequently, such switches are subject to fouling from floating debris, chips, and the like. It is also recognized that in any type of lever a pivot exists wherein the difference between moving and static friction will occasion jerky, unreliable operation.

It is, therefore, an object of this invention to provide a hermetically sealed self-contained float switch devoid of external levers.

Another object of the invention is to provide a liquid level switch which provides its own pivot structure.

To provide a liquid level switch which is free floating and compact and extremely simple to install even in small diameter sumps, are still other objects of this invention.

This invention further contemplates a mercury switch which is operable by a combination of means: namely mechanical, gravitational, buoyancy, floatation, balance, counterbalance, and specific gravity.

Other objects and attendant advantages of this invention will become more readily apparent and understood from the following detailed specification and accompanying drawings in which:

FIG. 5 is the float switch of FIG. 4 shown in the turned-on condition;

FIG. 6 is a view similar to FIG. 2 showing a third embodiment of a float switch; and FIG. 7 is a vertical section of a float switch illustrating a fourth embodiment of the invention.

Figure 1:
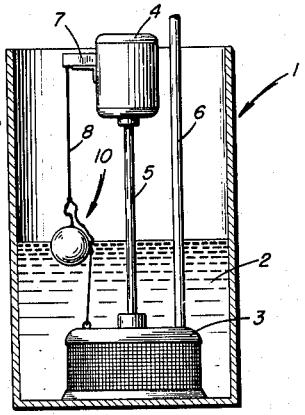
FIG. 1 is a vertical section through a typical sump showing a sump pump equipped with the novel float switch incorporating features of this invention.

Reference is directed to FIG. 1, wherein there is shown a typical sump pump installation such as used in the automatic draining of basements. It should be clearly understood, however, that the float switch of this invention may be used for many other situations requiring the automatic turn on, or automatic turn off of a pump or the signaling of a liquid level through remote electric means. The example illustrated is such as to exploit one of the good qualities of the invention because sump pumps are often contaminated by floating debris, such as wood chips which are quite likely to render the usual pump inoperative.

In FIG. 1, reference numeral 1 designates the sump. A sump pump 3 which is driven through a coupling shaft 5 by a motor 4, is mounted in the sump 1 and it is immersed in the liquid 2. The discharge pipe 6 of the pump 3 leads away to a sewer or sink not shown. The motor 4 is provided with an electrical junction box 7 and a waterproof flexible switch lead or electric cable 8 depends therefrom as shown.

Figure 2:
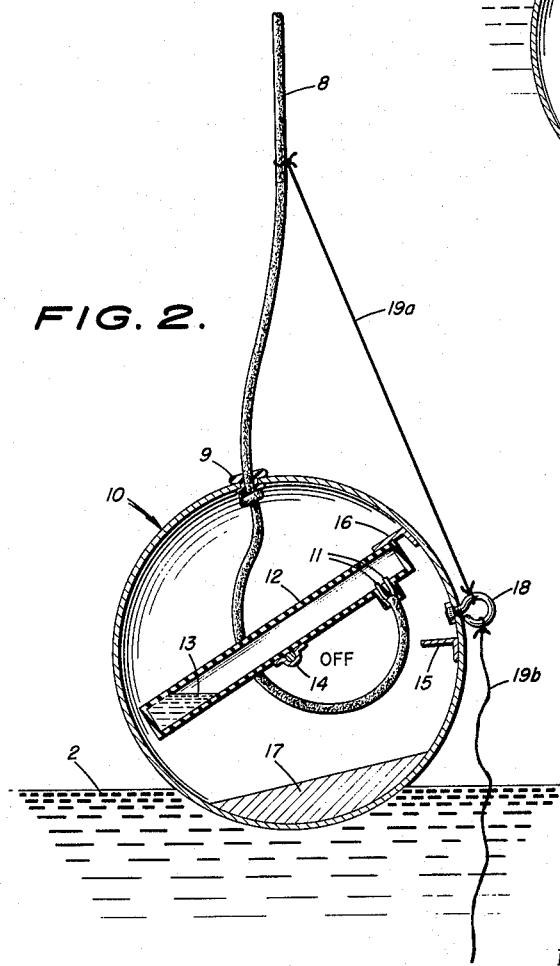
FIG. 2 is a vertical section taken through the center of the float switch illustrating a first embodiment thereof.

When the liquid 2 is at a low level as shown in FIG. 2, this cable 8 supports a spherical float switch 10. The float switch 10 is hollow and the cable 8 enters its interior through a hermetically tight bushing or seal 9 and connects to a pair of spaced electrodes 11 located in one end of an elongated tube 12 of insulating material such as phenolic or hard rubber. The ends of the tube 12 are closed and a small quantity of a conducting fluid such as mercury 13 is captivated therein and free to flow from one end to the other when the tube 12 is tilted.

For this purpose, a pivot 14 is provided diametrically across the interior of the float switch 10 upon which the tube 12 is transversely supported. A lower stop 15 and upper stop 16 are secured on the interior wall of the float switch 10 and they limit the angle of tilt and also determine two resting positions of this tube 12.

A weight 17 secured to the inner wall of the float 10 is provided to localize the center of gravity at a point generally opposite the seal 9. On the exterior wall at a point close to the location of the lower stop 15 and normal to the axis of pivot 14, an eye 18 is fastened. This eye 18 is used to secure an upper lanyard 19a and lower lanyard 19b.

The upper lanyard 19a is tied to the cable 8 with such length as to tug on the eye 18 when the weight of the float switch 10 begins to be supported from the previously mentioned junction box 7. At this time, the electrodes 11 are jumpered by the mercury 13, the motor 4 is operating and the pump 3 is lowering the level of liquid 2. As the lanyard 19a takes the strain, the spherical float switch 10 rotates on its own axis, and stop 15 comes up and tilts the tube 12 beyond horizontal. This causes the mercury 13 to run to the end of tube 12 remote from the pair of contact electrodes 11. With suitable wiring of the cable 8, the pump motor 4 stops.

The lower lanyard 19b is secured at its lower end to the pump 3 or the bottom of the sump 1, with such length as to exert a pull on eye 18 only when the float switch 10 is buoyed by the liquid 2 and becomes non-dependent from the cable 8.

Figure 3:
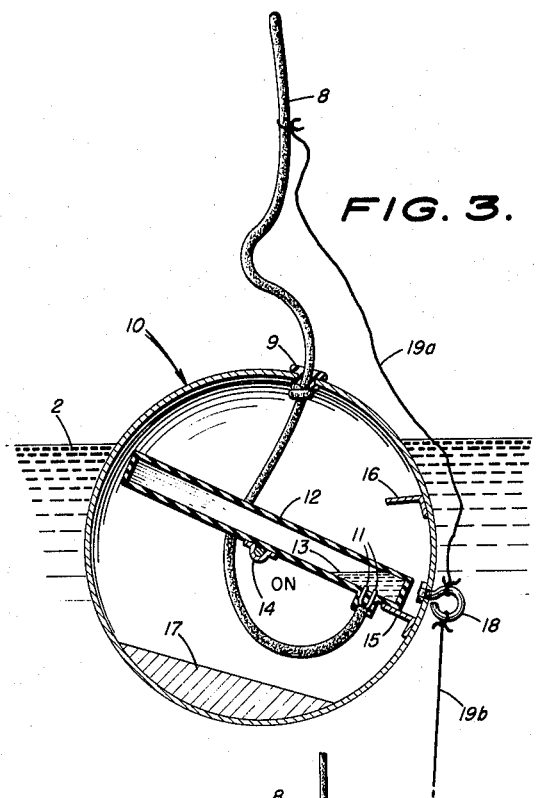
FIG. 3 is the float switch of FIG. 2 illustrated in the turned-on condition.

As shown in FIG. 3, the displaced center of gravity from weight 17 causes the floating spherical float switch 10 to rotate upon its axis so that stop 16 comes down to tilt the tube 12. As this tilt passes through horizontal, the mercury 13 flows to the end of tube 12 where the contact electrodes 11 are located. The result is a further tilting of the tube 12 and a making of electrical circuit as the electrodes 11 are bridged.

The pump motor 4 now operates to lower the level of the liquid 2 in the sump 1 and the cycle is complete. Additional slack may be included in the lanyards 19a and 19b if it is desired to increase the differential between the high and low levels of liquid 2.

Figure 4:
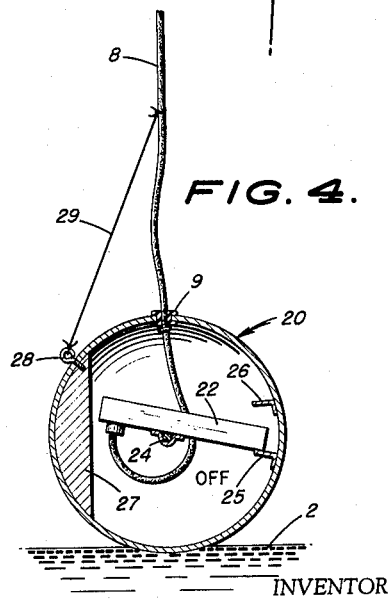
FIG. 4 is a view similar to FIG. 2 but illustrating a second embodiment of the invention.

FIGS. 4 and 5 show a liquid level switch 20 constructed so as to operate on total immersion in a fluid 2. In the fluid 2, the center of gravity is moved from the outer edge of the float switch 20 which is in the form of a ball where the weight 27 is located to a point toward the center of the ball. The fact that the weight 27 is on one side of the ball has a tendency to pull that side of the ball down. The air space on the other side of the ball has a tendency to raise that side of the ball, thusly rotating the ball to the position of actuation as shown in FIG. 5.

The relative positions of the mercury switch 22 and its pivot 24, the lower and upper stops 25 and 26, the weight 27, eye 28 and tautness of lanyard 29, in FIGS. 4 and 5 are to be noted. The float switch 20 need not be light enough to float on the surface of the liquid 2 as in the previous embodiment of the invention of FIGS. 2 and 3, nor is there need for a lower lanyard.

The mercury switch tube can be fixed within the float switch 20 if desired. This design is well adapted to an all-plastic construction as shown in FIG. 6. The float switch 30 is in the form of a plastic ball which may be hollow as shown or solid if desired. Two tubes (or bores) 32 and 34 extend in parallel, diametrically across the float switch 30. Mercury 33 is captivated in the tube or bore 32 and a few steel balls 35 are retained but free to roll in the tube or bore 34.

Electrodes 31 connected with the electrical cable 8 extend into the tube 32 near one end thereof. A weight 37 and an eye 38 are located as related for the previously described switches and suitable lanyards 39a and 39b are affixed thereto.

In operation, the balls 35 shift position in the tube 34 and assist the mercury 33 in positively making or breaking the contacts 31 by the sudden rotation thus caused of the entire assembly of the switch 30.

The switch 40 illustrated in FIG. 7 uses the principle of differential specific gravity. It will be noted the normal spherical outline of the device is altered by the provision of a protuberance 41 on the side of the switch 40 opposite to the location of the counterweight 47. This protuberance 41 is adjusted to have the same specific gravity as the liquid 2 either by filling it therewith as shown or by making it of a suitable material.

When immersed in the liquid, the switch 40 assumes an attitude due mainly to the pull of the counterweight 47 since at this time to all intents and purposes protuberance 41 is non-existent. However, when the liquid level drops and a strain is taken on lanyard 49, the protuberance 41 emerging into the air above the liquid 2 now takes on a counterbalancing function due to its weight in air and assists the lanyard 49 in rotating the switch 40 against the pull of counterweight 47.

The mercury switch 42 tilts on its pivot 44 under the urging of upper stop 46 and quickly transfers to lower stop 46 to actuate or turn off a device connected to electrical cable 8 as desired.

Obviously many modifications and variations of the present invention are possible in light of the above teachings. It is, therefore, to be understood that within the scope of the appended claims the invention may be practiced otherwise than as specifically described.

What is claimed is:

1. A switch for signaling the level of a liquid, comprising an annular housing floating on said liquid so as to move with the level thereof and having a weight positioned at its periphery to form the center of gravity and thereby the bottom of said housing, eye means secured to the exterior of said housing intermediate said bottom and the top of said housing, cable means extending from the interior of said housing to the exterior thereof through the top of said housing, a lower lanyard having its lower end restrained independent of said housing and its upper end secured to said eye means to exert a pull thereupon in one direction after a predetermined rise of said liquid, an upper lanyard having its upper end secured to said cable means exteriorly of said housing and restrained thereby by said cable means independently of said housing and its lower end secured to said eye means to exert a pull thereupon in the opposite direction after a predetermined fall of the level of said liquid, the pull by each said lanyard on said eye means causing the rotation of said housing in the direction corresponding to the direction of said pull, an elongated container positioned within said housing and containing an electrically conducting fluid medium for alternately passing from end-to-end of said container upon the rotation of said housing in said one direction and in said opposite direction, and electric circuit means including a pair of spaced electrodes positioned at one end of said container for circuit completion with said cable means and said electrically conducting fluid medium.

2. The switch as recited in claim 1 wherein said liquid is contained in a sump having a sump pump positioned therein and said lower end of said lower lanyard is secured to the lower end of said pump.

3. The switch as recited in claim 2 wherein the motor of said pump is positioned above said sump, said electrical cable means extends from said motor to said spaced electrodes of said electric circuit means.

4. A switch for signaling the level of a liquid, comprising an annular housing floating on said liquid so as to move with the level thereof, eye means secured to the exterior of said housing intermediate the top and bottom thereof, an electrical cable extending from the interior of said housing to the exterior thereof through the top of said housing, an upper lanyard having its upper end secured to said cable exteriorly of said housing and thereby restrained independently of said housing and its lower end secured to said eye means to exert a pull thereupon and a corresponding rotation of said housing in the upper direction upon a predetermined fall of the level of said liquid, a weight secured to the periphery of said housing to rotate said housing in the opposite direction upon a predetermined rise in the level of said liquid, an elongated container positioned within said housing and containing an electrically conducting fluid medium for alternately passing from end-to-end of said container upon rotation of said housing in said upper direction and in said opposite direction, and electric circuit means including a pair of spaced electrodes connected to said cable on the interior of said housing and positioned at one end of said container for circuit completion by said electrically conducting fluid medium.

References Cited by the Examiner

UNITED STATES PATENTS

| 1,925,633 | 9/1933 | Gulick | 200—84 |
| 2,205,352 | 6/1940 | Fisher | 43—44.94 X |
| 2,600,659 | 6/1952 | Koch | 200—84 |
| 3,045,084 | 7/1962 | Sperowitz | 200—84 |
| 3,090,849 | 5/1963 | Coulin | 200—84 |

FOREIGN PATENTS 225,856   6/1925   Great Britain.

BERNARD A. GILHEANY, *Primary Examiner.*

H. A. LEWITTER, *Assistant Examiner.*